June 20, 1933.  C. G. E. ANDERSON  1,914,987
POULTRY FEEDER
Filed May 4, 1928
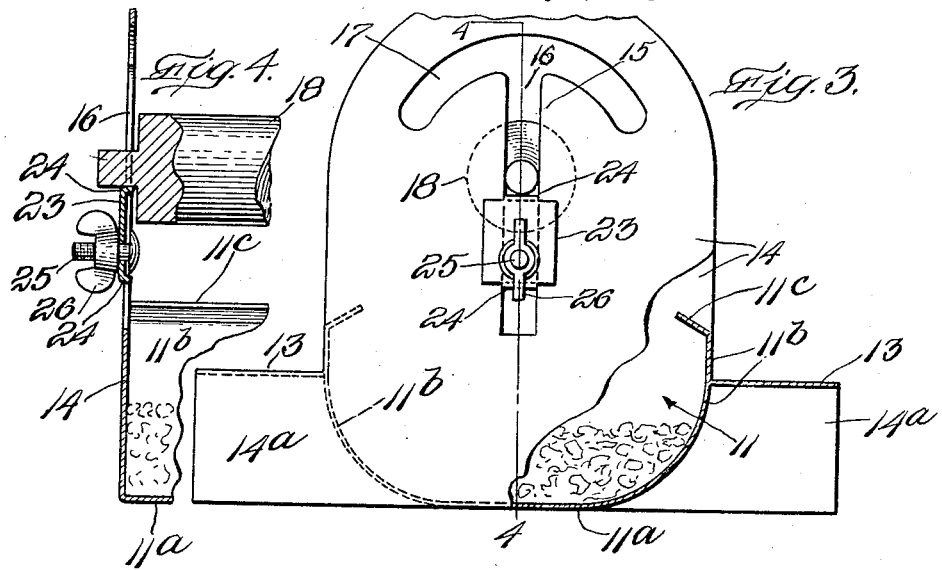
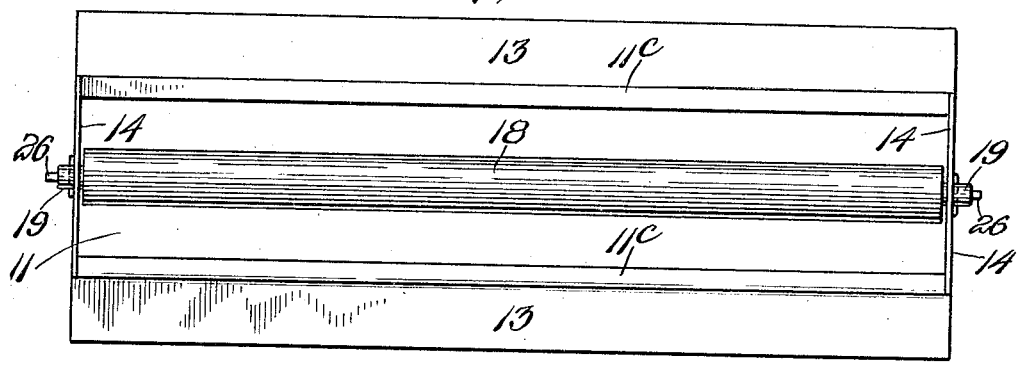
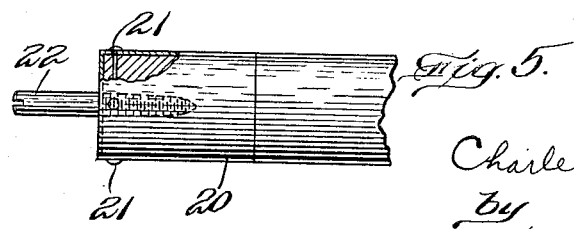
Inventor:
Charles G. E. Anderson
by
Holton, Murray & Cole attys.

Patented June 20, 1933

1,914,987

UNITED STATES PATENT OFFICE

CHARLES G. E. ANDERSON, OF ANDOVER, MASSACHUSETTS

POULTRY FEEDER

Application filed May 4, 1928. Serial No. 274,985.

This invention relates to improvements in in poultry feeders, and more particularly to the type of same adapted for the feeding of chickens or other young fowls.

One object of the invention is to provide a simple and inexpensive device of the above character which is constructed with a view to preventing the chickens from entering the trough part of the feeder, thereby preventing the wasting of feed and contamination of the trough by the fowls.

Another object of the invention is to provide an efficient but inexpensive means for adjusting the feeder so that it may be used for young fowls at any stage of their growth.

Another object of the invention is to provide a simple means whereby the trough may easily be supplied with feed or emptied and cleaned.

With the foregoing and other objects in view, the invention resides in the certain novel and useful construction and arrangement of parts as will be hereinafter more fully described, set forth in the appended claims, and illustrated in the accompanying drawing, in which:

Figure 1 is a top plan view of my improved poultry feeder.

Figure 2 is a side elevation.

Figure 3 is an end elevation partly broken away and in section.

Figure 4 is a section on line 4—4 of Figure 3.

Figure 5 is a detail of a modification described later.

Like numerals and letters of reference indicate corresponding parts in each figure.

In the drawing the poultry feeder is shown consisting of a trough 11 made preferably of sheet metal, composed of a bottom 11a, sides 11b extending obliquely inwardly to provide splash guards 11c, end plates 14 having outer wings 14a on which elevated platforms 13 rest, which platforms the chickens stand on while feeding from the trough. The end plates 14 have slots 15 cut therein, preferably anchor-shaped as shown, each slot consisting of a shank-shaped or vertical aperture 16, and an arm-shaped or horizontal aperture 17.

A rod or bar 18 extends above the trough 11 between the two end plates 14, and is rotatably mounted in the vertical portion 16 of said anchor-shaped slots 15. This rod 18 is preferably circular, and its ends 19 are smaller than the body so that said ends 19 fit loosely in the slots 15, thus permitting the rod 18 to freely rotate. The body of said rod may be angular or rectangular instead of circular if so desired. This rotative rod prevents the fowls standing above the feed, as when they mount said rod it turns and they must perforce come down. Figure 5 shows a modified construction whereby the rod is of less length than the distance between the two end plates 14. In this construction the ends are enclosed in ferrules 20 held in position by nails 21, and headed pins or screws 22 are fastened to the ends of the rod 18.

The rod is preferably supported in the end plates 14 by resting upon a perforated rectangular piece 23 having necks 24 at each end which are bent inwardly to loosely fit in the slot portion 16, the rod 18 resting directly on one of said necks.

The rectangular piece 23 is held in any desired position within the vertical slot portion 16 by means of a screw-threaded bolt 25 which is inserted through both the vertical aperture 16 of said slot 15 and the perforation in said piece 23 and held in position by tightening the nut 26 on said bolt 25. This nut is preferably of the wing type as shown.

The rod 18 may be adjusted to any desired degree within the vertical aperture 16 of said slot 15 by merely loosening the nut 26 and moving the bolt 25 and perforated rectangular piece 23 up or down as desired and then tightening said nut 26 on said bolt 25. By means of this fine adjustment feature it is now possible to continuously use the same feeder for chickens from their babyhood to maturity. When they are small the bolt 25 and rectangular piece 23 are mounted in the lower portion of the vertical slot section 16, so that the space between the rod 18 and the splash guards 11c of the sides 11b is small enough to prevent a chicken from getting into the feeder trough 11 and yet large enough for the chicken's head and neck to enter in order to feed. Then as the fowls grow larger the rod is moved higher in the vertical slot portion 16 thereby providing more space between it and the side splash guards 11c so that the larger fowls may continue to feed out of the trough conveniently.

Heretofore the rods used in poultry feeders have been fixed to the end plates in such a way that they were not adjustable, so that when chickens outgrew one feeder another one was required. My invention makes one feeder serve during the entire growth of the chickens, and yet the cost of manufacturing it is practically the same as the feeders heretofore used.

When it is desired to replenish the feed in the trough 11, or to empty and clean it, the horizontal aperture 17 of said anchor-shaped slots 15 makes these tasks convenient, as the rod 18, which is resting upon the rectangular piece 23, is merely lifted to the top of the vertical slot section 16 and pushed to either side in the horizontal slot portion 17. The rod 18 is thereby thrown well over to one side leaving plenty of space on the opposite side between the rod and the side splash guards 11c for the introduction of feed or to empty and clean the trough.

It will be understood that the various parts of my invention may be changed without departing from the spirit thereof, and hence I do not limit myself to the precise construction set forth; but consider that I am at liberty to make such changes and alterations as fairly come within the scope of the appended claims.

What I claim is:

1. A device of the class described comprising a trough, end walls, a rod mounted in said end walls, and means for vertically adjusting said rod in said end walls, said end walls having provision for guiding said rod laterally in said end walls.

2. A device of the class described comprising a trough, end walls, a rod mounted in said end walls, and means for vertically adjusting said rod in said end walls to any degree within the range of said means, said end walls having provision for guiding said rod laterally in said end walls.

3. A device of the class described comprising a trough, end walls, a rod mounted in and extending between said end walls, said end walls having T-shaped slots therein for vertical and lateral movement of said rod in said slots, a member slidable vertically in said slots on which said rod rests, and means to hold said member in place in any desired position in said slots.

4. A device of the class described comprising a trough, end walls, each end wall having a vertical slot cut therein and slots extending to the right and left of said vertical slot, a rod mounted in said vertical slots and movable into either of said right and left slots and to rest at the end of said slots when it is desired to clean the trough, and means to hold said rod in any desired position in said vertical slots.

5. A device of the class described comprising a trough, end walls, each having an anchor shaped slot therein, a rod rotatably mounted in the vertical portion of said slots and movable to either of the arm portions of said slots and to rest at the end thereof, and means to support said rod in any desired position in said vertical portions of said slots.

6. A device of the class described comprising a trough, end walls having vertical and laterally extending slots therein, a rod mounted in said slots in said end walls, a member for each end wall on which the end portions of said rod rests, and a bolt and a nut for each member to hold said member in place in whatever position in the vertical portions of said slots it is desired to have said rod rest.

7. A device of the class described comprising a trough, end walls, each end wall having a vertically extending slot therein, a rod rotatably mounted in said slots, a member for each end wall on which the end portions of said rod rest, and a bolt and a nut for each member to hold said members in place anywhere with respect to said slots.

8. A device of the class described comprising a trough, end walls, a rod mounted in said end walls, each of said end walls having a T-shape slot whereby said rod may be moved laterally and remain in a lateral position upon completion of said lateral movement.

CHARLES G. E. ANDERSON.